United States Patent [19]

Schloss, Jr.

[11] Patent Number: 4,561,975

[45] Date of Patent: Dec. 31, 1985

[54] SELF-RELIEVING BAR SCREEN

[76] Inventor: Charles M. Schloss, Jr., 3198 Nome St., Aurora, Colo. 80010

[21] Appl. No.: 468,704

[22] Filed: Feb. 22, 1983

[51] Int. Cl.⁴ ........................................... B01D 35/16
[52] U.S. Cl. .................... 210/155; 210/159; 210/162; 210/396
[58] Field of Search ............... 210/156, 159, 155, 391, 210/396, 162

[56] References Cited

U.S. PATENT DOCUMENTS

| | | | |
|---|---|---|---|
| 973,697 | 10/1910 | Potts | 210/156 |
| 2,102,570 | 12/1937 | Lind | 210/159 |
| 2,128,347 | 8/1938 | Briggs | 210/159 |
| 2,899,062 | 8/1959 | Heacock | 210/158 |
| 3,190,448 | 1/1962 | Johnston et al. | 210/159 |
| 3,591,006 | 7/1971 | Daferner et al. | 210/159 |
| 3,836,463 | 9/1974 | Teague et al. | 210/162 |
| 3,856,216 | 12/1974 | Teague et al. | 241/166 |
| 3,909,411 | 9/1975 | Angele et al. | 210/159 |
| 4,184,957 | 1/1980 | Botsch | 210/159 |
| 4,214,989 | 7/1980 | Rudolph et al. | 210/159 |
| 4,447,323 | 5/1984 | Jackson | 210/159 |

FOREIGN PATENT DOCUMENTS

| | | | |
|---|---|---|---|
| 864897 | 3/1971 | Canada | 210/159 |
| 382670 | 12/1964 | Switzerland | 210/162 |

Primary Examiner—David L. Lacey
Assistant Examiner—Titus B. Ledbetter, Jr.
Attorney, Agent, or Firm—H. B. Van Valkenburgh; Jerry W. Berkstresser

[57] ABSTRACT

A self-relieving bar screen, for intercepting debris moved by a liquid through a conduit into a space having a greater lateral dimension, includes a series of bars disposed in spaced lateral relation in a position normally opposite the discharge end of the conduit, with a lower, generally forwardly extending portion of each bar below the lower edge of the conduit and a generally upwardly portion extending up to opposite the upper edge of the conduit. The series of bars extend laterally past each side of the conduit but for a distance less than the width of the wall at which the conduit terminates. The side spaces thus provided permit liquid to flow to each side of the bars, in the event debris accumulates on the bars and may otherwise tend to obstruct the flow of liquid. The bar screen may be moved upwardly periodically with the debris collected thereby and emptied into a receptacle or the like, through a pivotal rake which is specially positioned. The bar screen may be guided during upward and downward movement, imparted by a chain, cable or the like, by a roller or sliding block movable in a channel having a curved upper end to tip the bar screen for discharge. A screen gate may be associated with the bar screen to close the end of the conduit when the bar screen is discharging. This screen gate may have blades covering the end of the conduit, moved into position by a cable and counterweight arrangement. The screen gate is moved downwardly, to uncover the end of the conduit, by the bar screen when it is moved to collecting position. The bar screen which relieves flow when debris accumulates on it may also be fixed and a cleaning rake moved upwardly through it, the cleaning rake having teeth interspaced with the bars of the bar screen. A special deflector for removing debris and a roller-mounted wiper blade for the cleaning rake are also disclosed.

23 Claims, 23 Drawing Figures

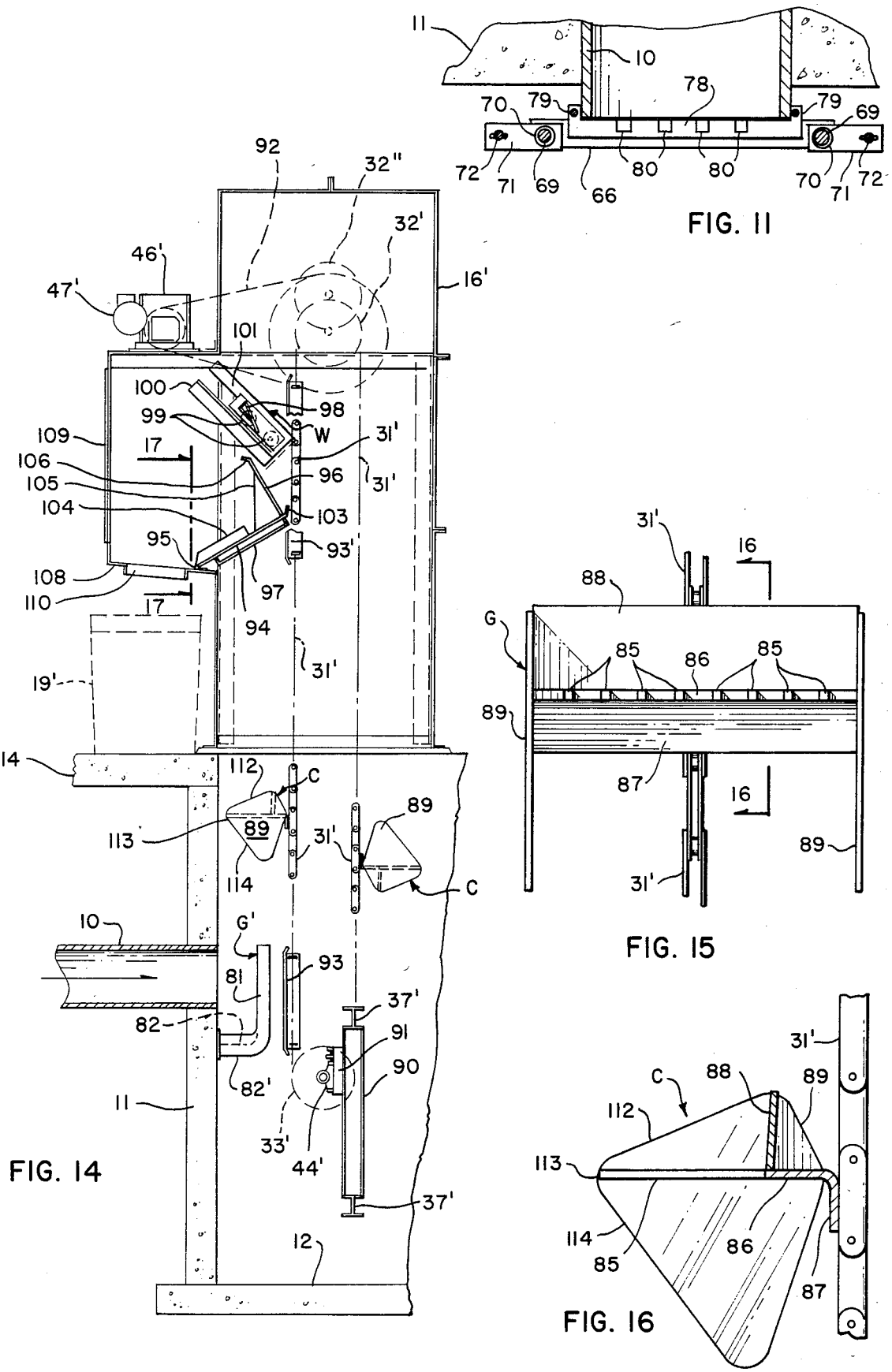

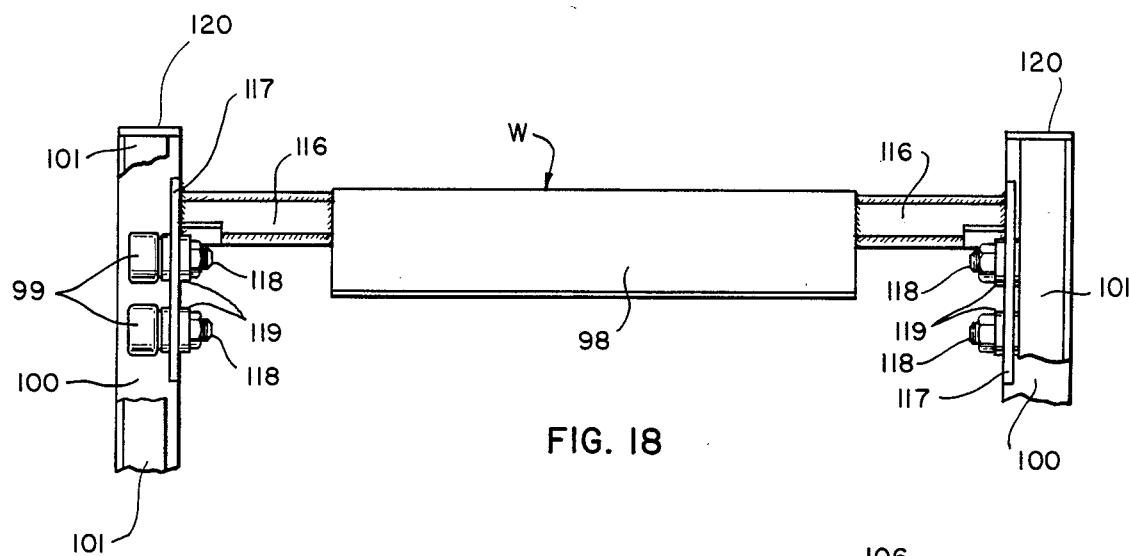
FIG. 18
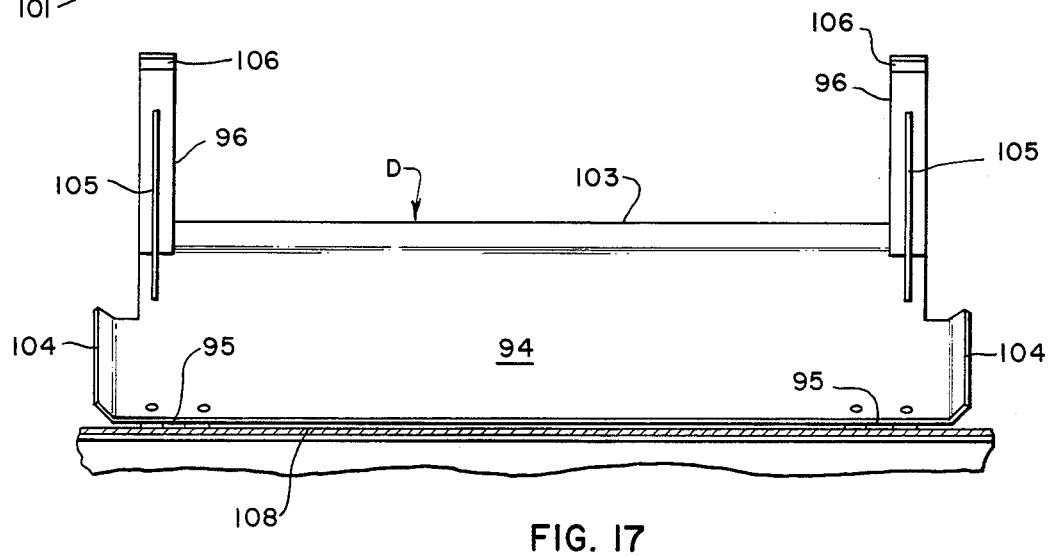
FIG. 17
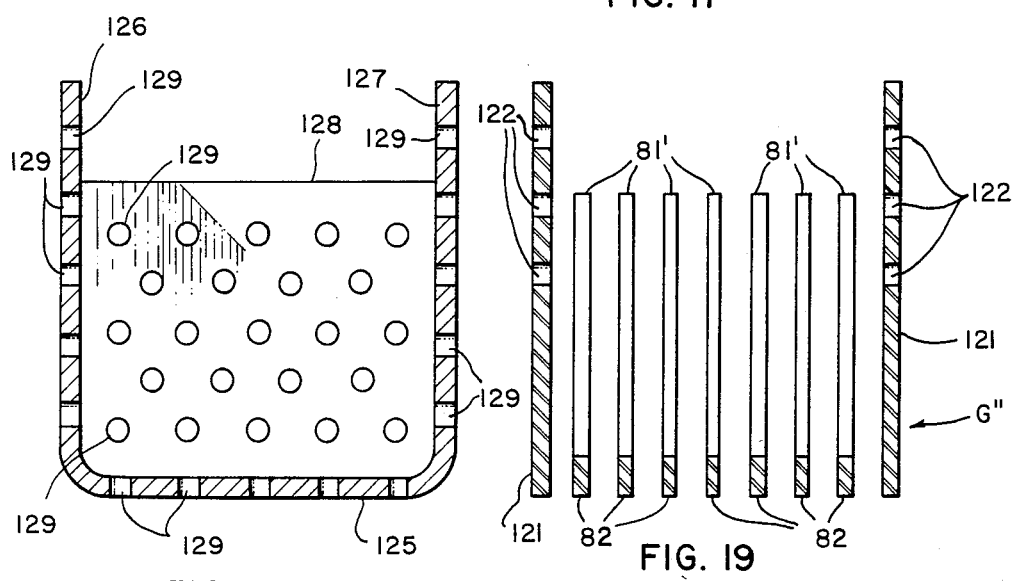
FIG. 20
FIG. 19

SELF-RELIEVING BAR SCREEN

This invention relates to bar screens or grids for collecting and removing trash or debris from waste liquid or sewage.

BACKGROUND OF THE INVENTION

Bar screens or grids are conventionally utilized in the removal of trash or debris from waste liquid, such as sewage, either in a channel or the like or as the liquid flows into a well or sump, in which it is collected for feeding to a lift pump which elevates the liquid to a higher elevation for flow to another collection system or to a treatment plant or the like. In a channel, a bar screen necessarily extends from side to side of the channel, while previous bar screens, at the mouth of a pipe which conveys the liquid into a sump or well for the above purposes, also extends from side to side or wall to wall of the well or sump. Such bar screens are subject to plugging, i.e. trash or debris collecting thereon, if not removed, for example, if a mechanical or electrical failure should occur, may stop the flow through the channel, pipe or the like. This plugging may result in sewage overflowing manholes in the streets, backing up into building and home basements, causing sedimentation and consequent blockage in the sewer pipes, or the like. Also, such bar screens have been cleaned by front or rear grids or rakes, normally moved downwardly in spaced relation to a fixed screen or grid, but when a position opposite the lower end of the screen or grid is reached, moved forwardly until the cleaning grid or rack is inserted under the debris or trash collected by the bar screen, then moved upwardly along the bar screen. After reaching the top of the bar screen, the cleaning grid or rack is elevated to a position in which it may deposit the collected debris or trash, as into a receptacle or other suitable place. Normally, a bar screen or rake slants upwardly from the bottom of a tunnel and the movement of the cleaning grid or rake along the bar screen corresponds to such inclination. Bar screens or grids which are cleaned from the front may extend to the top of a channel or the like. However, upright bar screens or grids which are cleaned from the rear require that the generally horizontal teeth, bars or the like of the cleaning rake be inserted between the generally upright bars of the grid or screen to be cleaned, then moved upwardly past the upper ends of the fixed grid or rack, which must be free for passage of bars or teeth of the cleaning rake. Irrespective of whether a fixed screen or grid is cleaned from the front or rear, the extension thereof to the wall at each side, whether in a channel or in a well or sump, again presents the possibility of plugging. Cleaning devices which include a rake moved downwardly in front to the lower end of a fixed grid or screen, then moved toward the grid or screen and then upwardly, may be represented by the pivoted rake of U.S. Pat. No. 3,358,837 or a rake which moves around a loop track, as of U.S. Pat. Nos. 2,128,347 or 3,591,006. There are also similar devices for cleaning from the reverse or rear side of the grid.

There are also variations, as in U.S. Pat. Nos. 3,836,463 and 3,856,216, which utilize a disintegrating device disposed between a pair of laterally spaced, upwardly inclined bar screens, through which the liquid flows but on which the trash or debris is caught, then moved upwardly by rakes which are reciprocated along the bar screens from the base to the upper end of each, then away from the screen and downwardly to the starting position. In the magazine PUBLIC WORKS for April 1982, at pages 66–68, a sewage lift station is disclosed having a basket strainer covering the end of a pipe discharging into a well, from which the liquid is fed to an elevating pump, and, in a modified system, a flat stock bar screen which surrounds the discharge end of a pipe, is utilized for a similar purpose. Although the actual improvement described in this article is in the pump installation, each of these screens illustrates an extension to each side of an outlet and to a wall. Also, both the basket strainer and the flat stock bar screen were cleaned manually by access through a manhole cover directly above. Nevertheless, the possibility of such a strainer or screen becoming plugged is evident.

Among the objects of this invention are to provide a bar screen which will intercept trash or debris carried by a liquid without becoming plugged; to provide such a bar screen which is open at the sides, or other appropriate position; to provide such a bar screen which may be periodically lifted in order to discharge the collected trash or debris into a receptacle or the like; to provide such a bar screen which is particularly adapted to collect trash or debris flowing through a pipe which discharges into a well or sump at a lift station; to provide such a bar screen which may be periodically moved upwardly to a dumping position but is utilized in conjunction with a screen gate which may automatically cover the mouth of the pipe while the collection screen is being dumped; to provide such a bar screen which is particularly adapted to be placed in a fixed position at the discharge end of a pipe or the like but which is open at the sides or other appropriate position to prevent blocking of liquid flow; to provide each such type of bar screen which is readily constructed, which is generally low in cost and which is effective in operation; to provide a rake especially adapted to remove the collected trash or debris from such a fixed bar screen; to provide such a rake which has fingers or the like which may be moved upwardly between the bars of the fixed bar screen; to provide such a rake which may be automatically unloaded at an upper position; and to provide such rakes which are readily constructed, generally low in cost and effective in operation.

SUMMARY OF THE INVENTION

A self-releiving bar screen of this invention may include a series of angular bars disposed in spaced lateral relation and having aligned substantially horizontal legs and upright or rearwardly extending legs. In its normal position, the lower horizontal legs extend almost to the lower edge of the pipe from which is discharged the sewage or the like from which trash or debris is to be collected, while upright legs extend upwardly to a point generally opposite the upper edge of the pipe. The lateral extent of the bar screen is less than the width of the well, sump or other area in which the bar screen operates, so that the open sides of the bar screen permit liquid to flow laterally, in the event that the horizontal legs and the upwardly extending legs become plugged with trash. An elevating mechanism for the bar screen may consist of chains engaging upper and lower sprockets mounted in laterally spaced positions on corresponding shafts, with a drive to the upper shaft from a reversible motor operating through a speed reducer. The upwardly extending bars of the screen are attached to a transverse rear plate, each end of which is, in turn, attached to a guide bar having a roller or slide block at its upper end which engages a corresponding channel and a pivotal attachment at its lower end, connected to the corresponding chain. The upper ends of the channels may be curved forwardly, so that when the roller or slide block reaches that position, the bar screen will be tipped forwardly for discharge of the trash carried thereby, as into an appropriately placed receptacle. Through a limit switch, the drive motor may be reversed to return the bar screen to a position in front of the discharge end of the pipe. A pivotal rake, which is mounted at the discharge position of the bar screen, has a transverse plate which slides down the upwardly extending legs on the bar screen as it approaches the discharge position, then slides forwardly along the normally horizontal legs as the bar screen is tipped, thereby insuring that any trash which does not fall off the bar screen will be moved off by the plate.

The ability to permit flow of liquid, even though the bar screen is plugged, may be utilized in a fixed screen, which is similar to the movable bar screen described above, but is anchored to the wall in front of the discharge end of a pipe. The rear legs of the bars of such a fixed screen may extend upwardly and the bottom legs forwardly to an anchor embedded in the wall below the pipe. The outermost bottom legs may be deeper than the intermediate bottom legs, in order to increase the ability to retain trash thereon.

Such a fixed screen may be periodically cleaned by a movable cleaning rake, similar in construction to the movable bar screen described above, but controlled so as to move periodically beneath the fixed bar screen, then upwardly with the horizontal bars or teeth thereof interspaced with the bars of the fixed screen. Such a cleaning rake may be modified by having side plates which act as cams for a deflector mounted just above the position of a collecting receptacle, as well as a rearwardly inclined plate instead of upwardly extending bars, which may move behind the fixed bar screen while collected trash is being removed from the same. The deflector may comprise a pivotal plate having a guide arm at each side, engaged by the corresponding side flange of the cleaning rake. Such a guide arm may extend upwardly and forwardly from the deflector plate which, in its trash receiving position, is inclined downwardly toward the receptacle. The guide arm may also extend around and below the collector plate, so as to be engaged by a downwardly inclined front upper edge of the corresponding side plate, while the remainder of the guide, above the deflector plate, may be inclined upwardly at an angle corresponding to a downwardly and rearwardly inclined lower front edge of the corresponding side plate. As the cleaning rake moves upwardly, the upper front edge of its side plates will tip the deflector plate upwardly, until the front corner of each side plate, at the level of the horizontal fingers, reaches the intersection of the upper and lower portions on the corresponding guide arm, at which time the deflector plate will tip downwardly until the upper portions of the guide arms parallel the lower front edges of the side plates. At this time, the deflector plate will be positioned with its upper edge on a level with the horizontal fingers of the cleaning rake. At the same time, an angularly disposed transverse wiper blade, mounted on a roller assembly at each end for forward, upwardly inclined movement, will engage the upper edge of the rearwardly inclined, central plate of the cleaning rake. As the cleaning rake moves upwardly, the wiper blade will move downwardly along the central plate, until the horizontal fingers are reached, when the wiper blade will move forwardly along the fingers as the cleaning rake is moved further upwardly along its forward, upwardly inclined path. Thus, by the time the wiper blade clears the fingers of the cleaning rake, all of the trash collected by the cleaning rake should have been pushed off the cleaning rake onto the deflector plate, to slide downwardly into the receptacle.

An alternative fixed screen may be provided with side plates, but with the rear bars terminating below the upper ends of the plates. Perforations in the side plates, particularly in the upper portions thereof, may permit the flow of liquid until plugged. Other selfrelieving screens include a bucket shape having bottom, side and lower back plates provided with perforations; and both with and without side plates but with a portion of the rear bars lower than other rear bars or the sides. Also, a similar screen with a portion of the bars lower than the other bars is placed in a channel, for use with a rear cleaning mechanism.

THE DRAWINGS

FIG. 1 is a central vertical section, taken along line 1—1 of FIG. 3, of a self-dumping trash screen of this invention, for a pumping station, lift station or the like.

FIG. 11 is a fragmentary vertical section taken along line 11—11 of FIG. 10.

FIG. 14 is a condensed vertical section, on a reduced scale from FIG. 12, showing associated parts and a cleaning rake particularly adapted to be utilized for periodically removing debris from the fixed screen of FIG. 12.

FIG. 15 is a front elevation, on an enlarged scale, of the cleaning rake of FIG. 14.

FIG. 16 is a vertical section taken along line 16—16 of FIG. 15.

FIG. 17 is a fragmentary vertical section taken along line 17—17 of FIG. 16, on an enlarged scale and showing particularly a debris deflector which operates in conjunction with the cleaning rake of FIGS. 14–16.

FIG. 18 is a fragmentary top plan view, on an enlarged scale, of a wiper of FIG. 14, which also operates in conjunction with the cleaning rake.

FIG. 19 is a vertical section, similar to FIG. 13, but showing a fixed grid alternative to that of FIGS. 13 and 14.

FIG. 20 is a vertical section, similar to FIG. 19, showing a self-dumping screen alternative to that of FIGS. 1–8.

DESCRIPTION OF THE PREFERRED EMBODIMENT

Figure 1:
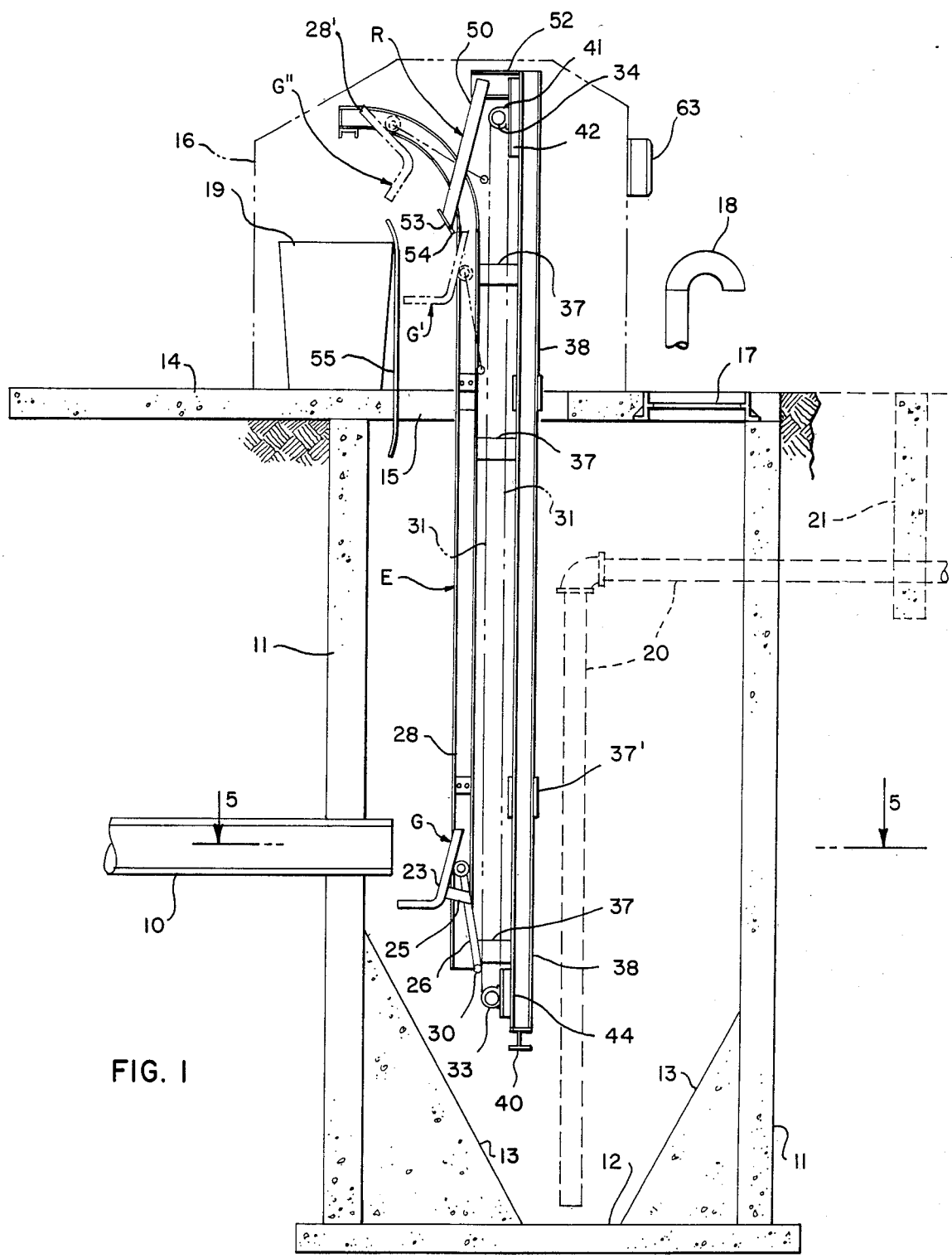
Figure 3:
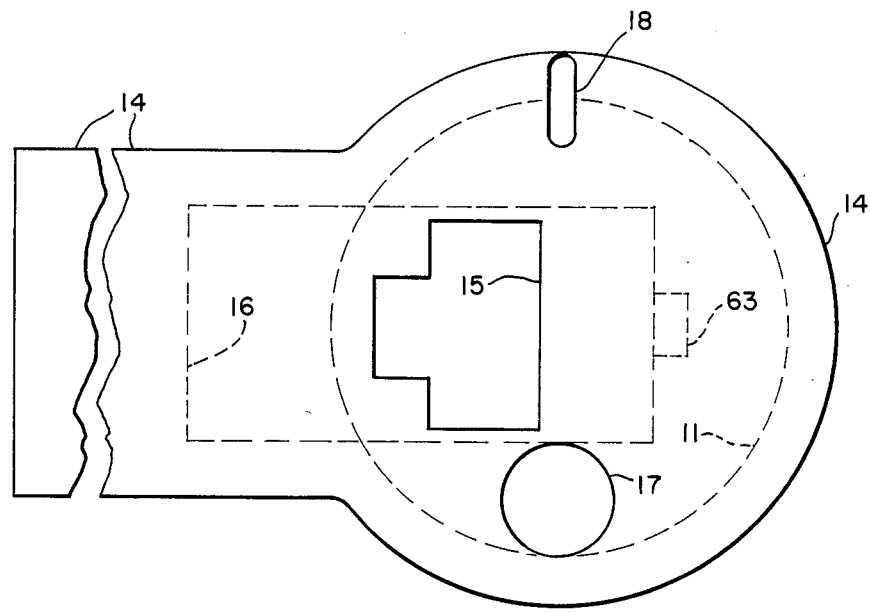
FIG. 3 is a top plan view of the installation of FIG. 1, but omitting the equipment shown in FIG. 2.

A self-dumping trash screen of this invention, particularly adapted for use at an unattended sewage lift station and as illustrated in the drawings, may be designed to remove trash as it flows from a pipe 10 into a well provided by a surrounding wall 11 having a bottom 12, as in FIG. 1, in which may be placed a cone of concrete grout 13. At ground level, or any other convenient location, a slab 14 of FIGS. 1 and 3, as of concrete, may cover the well except for an opening 15 through which an elevating mechanism E extends. Slab 14 may support a housing structure 16, shown also in dot-dash lines in FIG. 1, while a manhole cover 17 and a vent pipe 18 may be associated with the slab 14. Manhole cover 17 and vent pipe 18 are shown out of position in FIG. 1, for clarity of illustration of other parts. Inside the structure 16 is a receptacle 19 adapted to receive periodically the trash collected on a screen grid G, when elevated by the elevating mechanism E. By parts described in greater detail later, at periodic intervals, grid G is moved upwardly through the dotted position G' and to the dotted position G" of FIG. 1, at which the trash on the grid slides off or is pushed off by a rake R into the receptacle 19, then the grid is automatically returned to the lower position of FIG. 1, to again receive trash from pipe 10. During the time that grid G is moving upwardly for dumping trash into receptacle 19, the discharge end of pipe 10 is uncovered, but the amount of time spent is relatively short and the calculated risk small. Of course, the well may be periodically inspected for the purpose of removing any trash which may have collected in the well during periods that grid G leaves pipe 10 unattended. Or, an openwork frame may be pivoted across the end of pipe 10 when grid G rises and automatically pushed back when grid G comes down again, as shown in FIGS. 9–12. A pump intake pipe 20 extends through the wall 11 to a pump sump 21, in which a lift pump of a conventional character may be installed.

Figure 4:
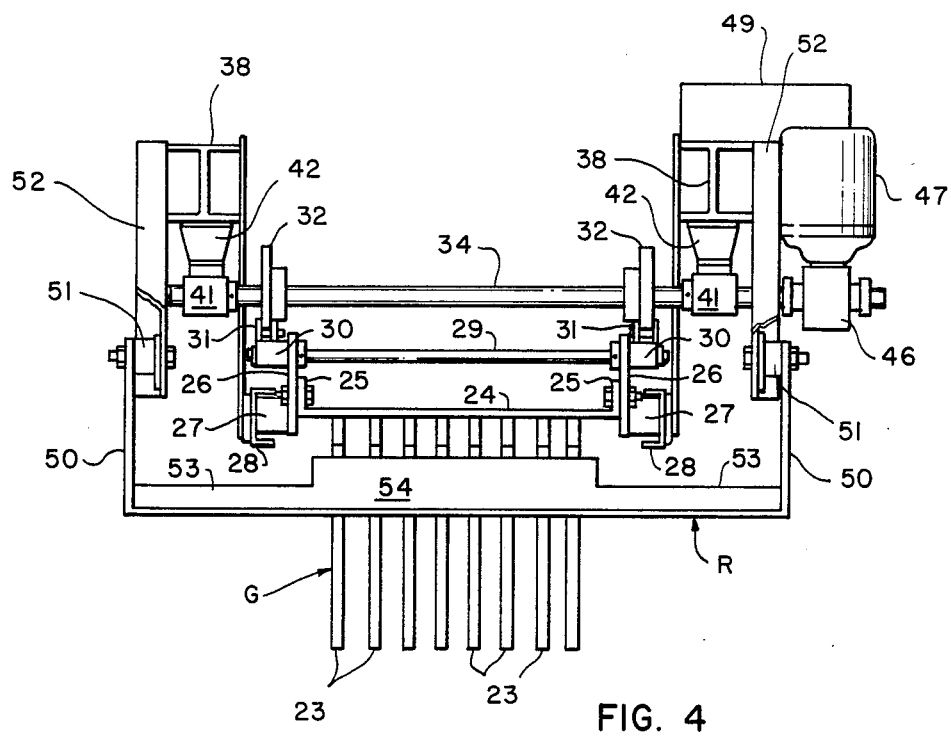
FIG. 4 is a top plan view of the equipment shown in FIG. 2.

The screen grid G, as in FIGS. 1, 2, 5 and 8, may be provided with a series of parallel angular bars 23, each formed to a right angle or obtuse angle shape, as shown, and mounted in spaced lateral relationship on a supporting bar 24 having a flange 25 at each end, as in FIG. 4. The horizontal legs of the bars 23 normally extend nearly to and are disposed below the discharge mouth of pipe 10, with the upwardly or rearwardly inclined legs extending to a position just below a point opposite the upper edge of the discharge mouth of pipe 10. The grid G is thus in a position to receive and collect trash carried through the pipe 10 by the waste liquid and to intercept that trash having a length or diameter greater than the spaces between the bars 23. It will be noted that the width of grid G is less than the width of the well provided by wall 11, as in FIG. 5, so that when debris collects on the grid, it will not stop the flow of liquid, normally water, which can escape to each side of the grid even though the bottom and back portions of the grid rods 23 may be plugged. This is an important feature of the grid, since previous stationary grids, which are cleaned by lifts moved upwardly along the grid from the front or from the rear, extend from wall to wall of a passage and a power or mechanical failure could cause plugging of the grid and consequent stoppage of sewage flow, causing sewer manholes to overflow, basements to be flooded, and the like.

Figure 2:
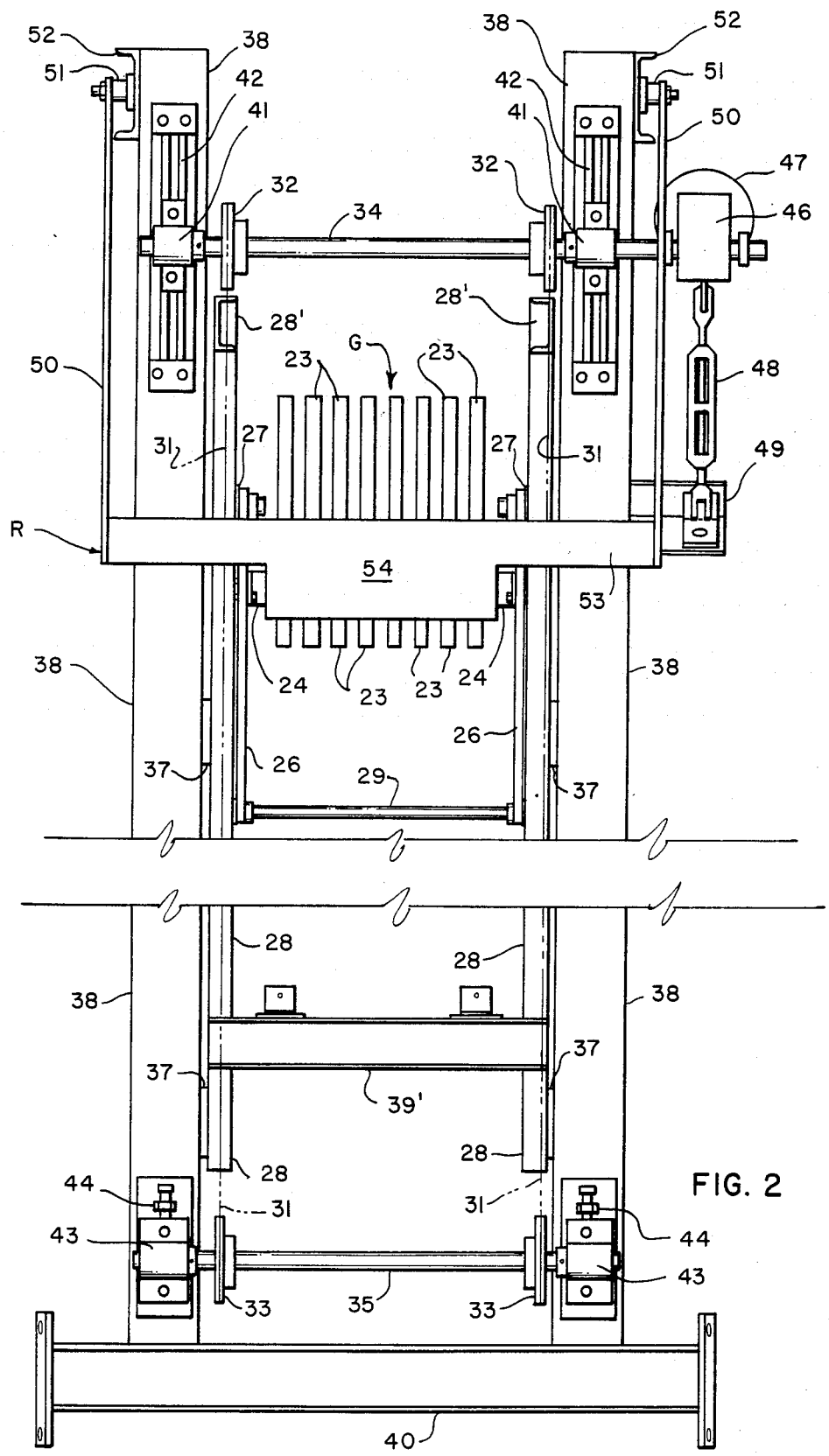
FIG. 2 is a condensed front elevation, on a slightly enlarged scale, of the equipment associated with chain and sprocket portions of the trash screen of FIG. 1.
Figure 5:
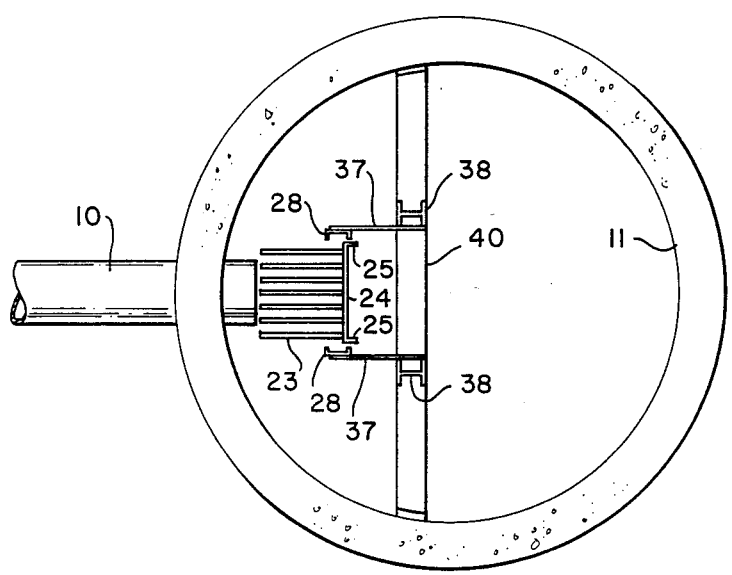
FIG. 5 is a cross section taken along line 5—5 of FIG. 1.

As in FIGS. 1 and 4, each flange 25 of bar 24 is removably connected to a guide bar 26. A guide roller or sliding block 27 is mounted at one end of each guide bar 26 and engages one of a pair of upright channels 28, while each guide bar 26 is attached at its opposite end to a shaft 29 by a pivot connection 30, in turn attached to a chain 31. Chains 31, as in FIGS. 1 and 2, are trained over an upper pair of sprockets 32 and a lower pair of sprockets 33, with the former being mounted on an upper shaft 34 and the latter on a lower shaft 35. Channels 28, which face toward each other, as in FIG. 5, are individually supported by a series of short beams 37 from a pair of upright supports, such as I-beams 38, in turn supported by cross beams 39 and 40 of FIG. 1, which extend between opposite walls 11, and reinforced by a cross beam 39' of FIG. 2, which extends between beams 38. Upper shaft 34 extends between I-beams 38 adjacent the tops thereof, as also shown in FIG. 2, with each end of shaft 34 being received in a bearing 41 supported by a conventional adjustable mount 42, attached to the corresponding I-beam 38 and utilized in adjusting the respective bearing upwardly and downwardly. Lower shaft 35 also extends between I-beams 38 but adjacent the lower ends thereof, with each end being received in a bearing 43 supported by a fixed mount 44. One end of upper shaft 34, as in FIGS. 2 and 4, extends to a gear reduction unit 46 driven by a motor 47. An adjustable torque rod 48 is connected between gear reduction unit 46 and an angle 49 attached to and extending laterally from a beam 38, to prevent any tendency for the gear reduction unit to rotate with upper shaft 34.

As will be evident from FIG. 6, when guide roller 27 is below an upper, curved portion 28' of channel 28, shown in full in FIGS. 1 and 8, the grid G will be maintained in a position with the lower legs essentially horizontal and the upper legs upright or slanting rearwardly. Thus, until the grid G reaches the dotted position G' of FIG. 1, the lower legs will remain essentially horizontal and therefore will retain the trash collected thereon. However, when the grid G is tipped, first slightly to the position $G_a$ of FIG. 8, and then further to the position $G_b$, at which position the ends of the lower legs will have reached a point slightly past the edge of receptacle 19, the trash will remain on the lower legs of the grid. However, as the grid moves from the position $G_b$ of FIG. 8, to the upper position $G''$ of FIGS. 1 and 8, the trash on the grid will tend to slide off into the receptacle 19. Full discharge of the trash is effectively secured by means of a rake R of FIGS. 1, 2, 4 and 8, having a pair of pivot bars 50, the upper ends of each of which are pivotally mounted by pivot bearings 51 on a short channel 52 extending from the top of a beam 38 and carrying at the lower end a transverse plate 53, having a deeper central portion 54, as in FIG. 2, which corresponds in width to the grid G. As the grid G is moved upwardly, the upright legs of the grid will move upwardly behind portion 54 of plate 53, in its normal position of FIG. 7, until the position $G'$ of FIG. 1 is reached. Then, as the grid is tipped forwardly by further engagement of roller 27 with portion 28' of channel 28, plate portion 54 will slide along the lower legs of the bars 23 of grid G. Thus, when the grid G reaches the position $G_a$ of FIG. 8, the plate portion 54 will have reached the bottom legs of the grid bars 23 and by the time the grid G has reached the position $G''$, shown in full in FIG. 8, the lower edge of the plate portion 54 will have reached the lower outer ends of bars 23. Thus, when the position $G''$ of the grid of FIG. 8 has been reached, any trash which has been collected on the grid will have either fallen off or will have been scraped off.

Figure 6:
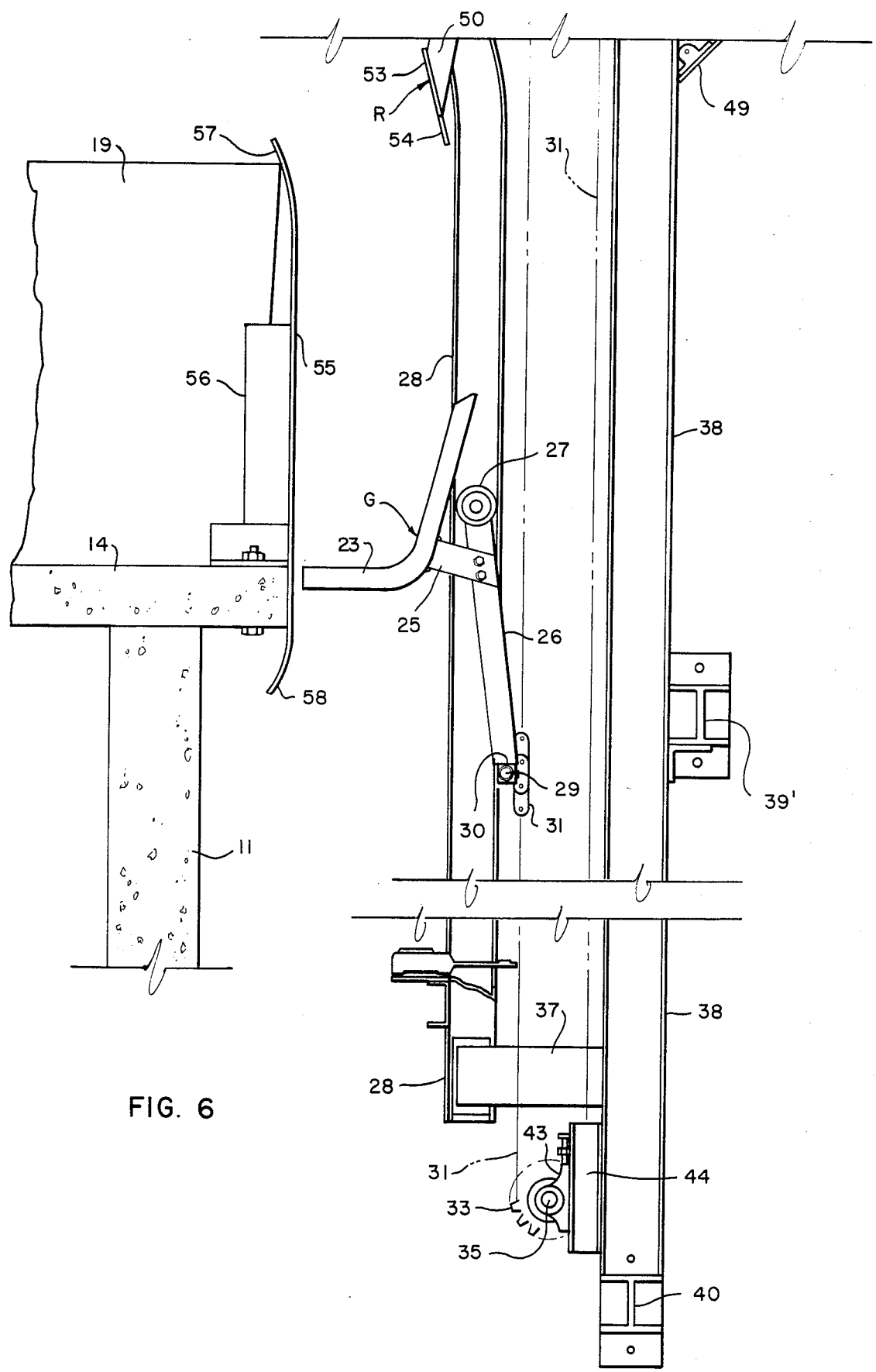
FIG. 6 is a side elevation of the lower and central portions of the equipment of FIG. 2, but with the screen having started upwardly for dumping.
Figure 7:
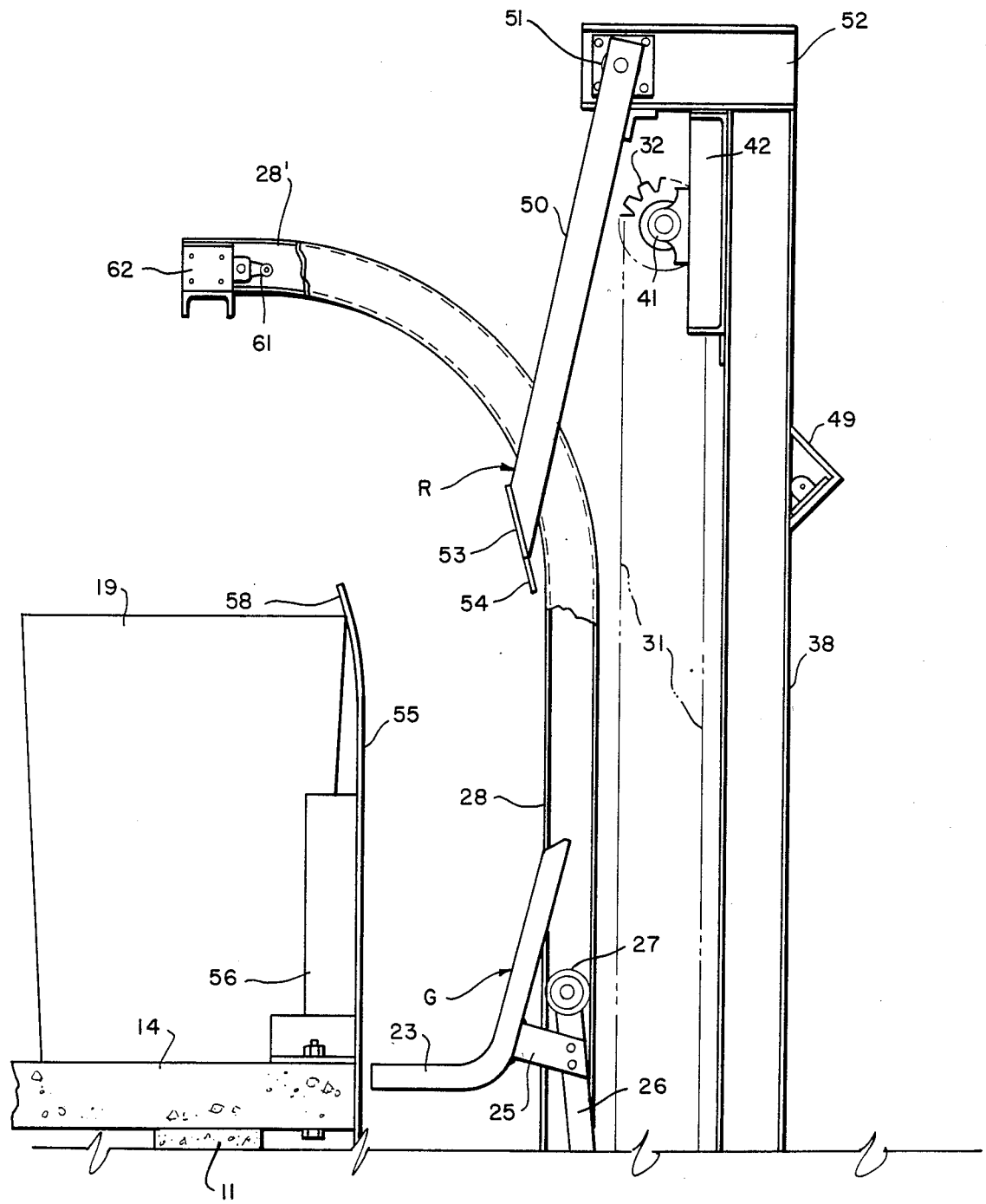
FIG. 7 is a side elevation of the central and upper portions of the equipment of FIG. 2, overlapping FIG. 6.

During its upward movement, as grid G approaches the opening 15 in slab 14 through which the elevating mechanism E extends, the trash on the grid will approach a protective plate 55 of FIG. 6, mounted on a support 56 and extending downwardly through the opening in slab 14 to a rearwardly curved lower end 57 and upwardly to a rearwardly curved upper end 58, above receptacle 19. Curved lower end 57 prevents trash on grid G from catching on the edge of the opening in slab 14 while curved upper end 58 insures that all trash which falls off grid G will be deposited in receptacle 19. It will be noted that, in position $G_b$ of FIG. 8, the rearwardmost points of the lower portions of bars 23 of grid G are rearwardly of the upper end of plate 55, while in position $G''$, the same rearwardmost points are directly above the rear edge of the upper end 58 of plate 55.

Figure 8:
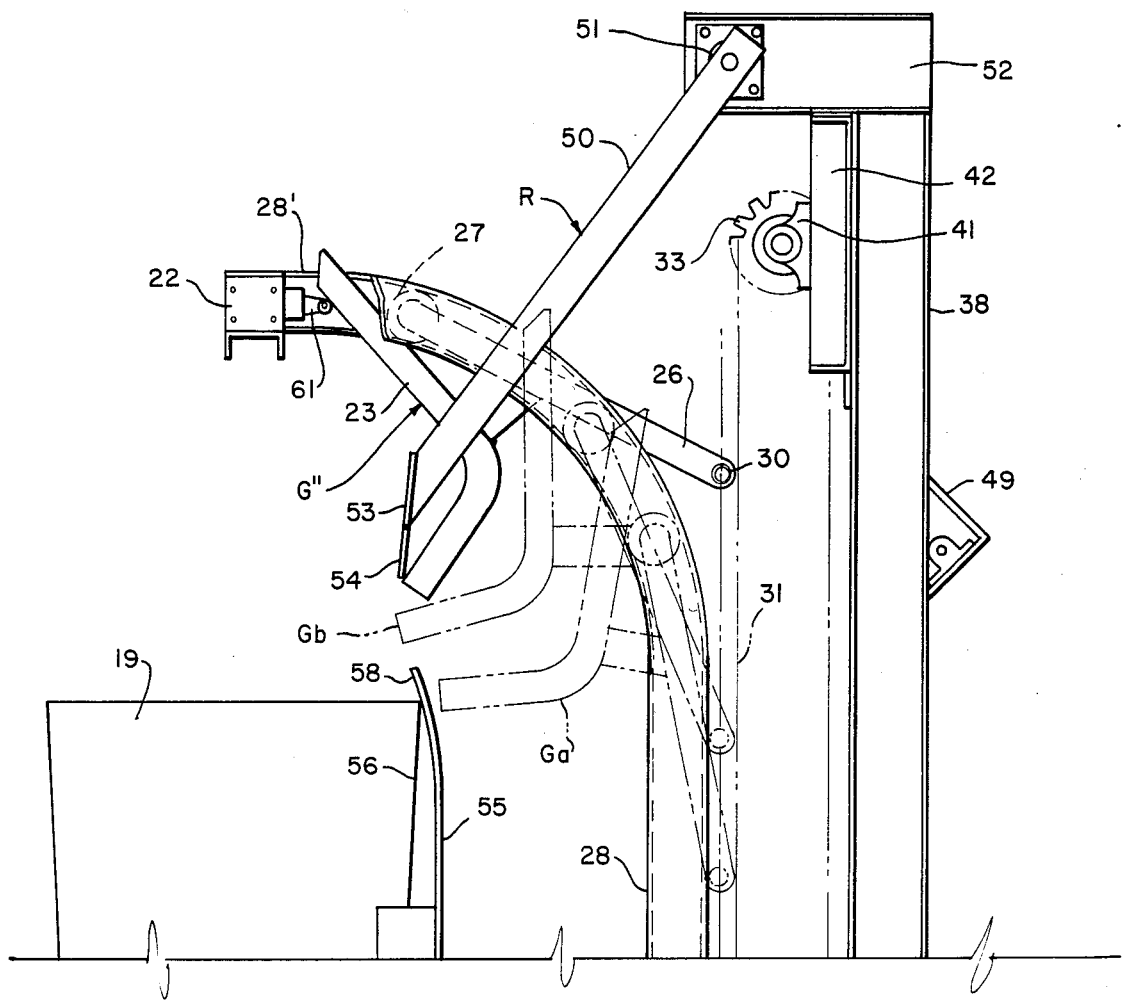
FIG. 8 is a side elevation of the upper portion of the equipment of FIG. 2 but showing the screen in dumping position in full lines and for other positions which precede the dumping position in dotted lines.

Upon traveling upwardly to the position $G''$ of FIGS. 1 and 8, an outer bar 23 of the grid, near its upper end, will engage a control arm 61 of a limit switch 62, which is connected to conventional controls for motor 47, of control panel 63 of FIG. 1, to stop the motor and thereby terminate upward movement of the grid G. After a suitable period, such as 2 seconds to 10 seconds, the motor may be restarted automatically, but in a reverse direction in order to move grid G downwardly again to its initial position facing the outlet of pipe 10, as in FIG. 1. Control panel 63 is conveniently mounted on the outside of housing 16, as shown, so that, although enclosed, it will be located in the atmosphere and therefore need not be explosion proof.

Figure 9:
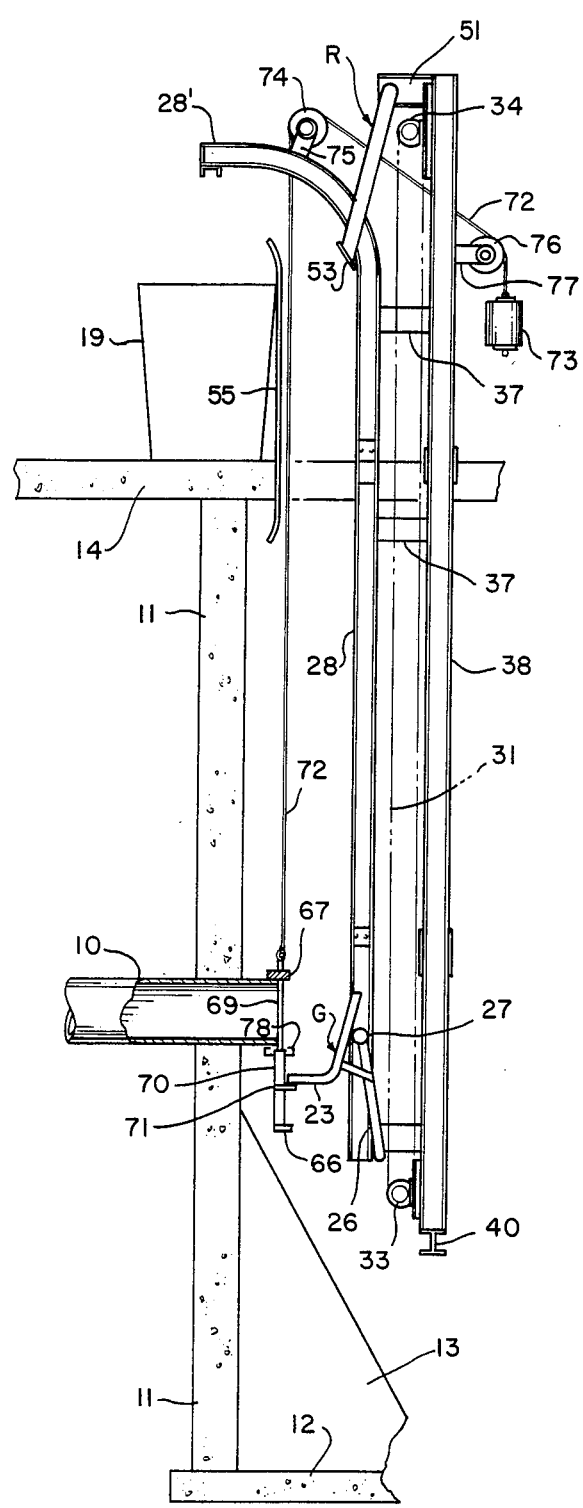
FIG. 9 is a central vertical section similar to FIG. 1, showing a similar self-dumping trash screen which operates in conjunction with a screen gate which is automatically moved upwardly over the mouth of an inlet pipe as the trash screen is moved upwardly and downwardly from the mouth of the inlet pipe when the trash screen is again moved downwardly.

The self-dumping trash screen of FIG. 9 is similar to that of FIG. 1, but includes a screen gate S which covers the end of pipe 10 when grid G is moved upwardly for dumping purposes, thus including a grid G having bars 23 and movable by chains 31, each connected to a guide bar 26 guided by roller 27 in a channel 28 and when moved upwardly, engagable with the rake R to insure that the trash collected on the grid G will be dumped into a receptacle 19. Other parts of FIG. 9 having the same reference numerals are similar to those of FIG. 1. Such a gate may include a series of upright blades 65 mounted on a base bar 66, which is associated with a support 67 having a notch 68 to fit against the top of pipe 10 and may be attached thereto in a suitable manner, as by a conventional U-clamp extending around the lower portion of pipe 10. Each of a pair of rods 69, depending at each side from the respective outer end of support 67, is engaged by a socket 70, attached to opposite ends of base bar 66 for guiding the screen gate during upward and downward movement. Each socket 70 has a laterally extending arm 71, each of which, as in FIG. 9, is engagable with the front lower ends of grid bars 23, at each side of the grid, so that the blades 65 of screen gate S will be pushed downwardly to a position below the front end of pipe 10, when grid G returns from a trip to deposit trash in receptacle 19. A cable 72, at each side, extends upwardly and across to a weight 73, which causes the screen gate S to be lifted upwardly so that blades 65 will cover the front of pipe 10 when grid G is moved upwardly. Thus, screen gate S will move upwardly until a rearward extension of base barr 66 abuts the underside of the front edge of the pipe. As Will be evident, when blades 65 cover the open end of pipe 10, while the grid G is dumping trash, any debris or trash moving through the pipe 10 will be stopped by blades 65 and remain in the pipe, but for a few minutes only until the grid G returns. Each cable 72 may extend upwardly to a pulley 74 mounted on a bracket atop but on the outside of the respective channel 28, at a position along the curved upward portion 28' thereof, so that each cable 72 may extend essentially directly downwardly for attachment to the outer end of the respective arm 71. Each cable 72 may also extend over a pulley 76, mounted on a bracket 77 attached to the corresponding upright beam 38, thence downwardly to the corresponding weight 73. As blades 65 lower, they are cleaned by a fixed rake bar 78 which is supported at the lower edge of pipe 10 by rods 79 from support 67. Rake bar 78, as in FIG. 11, is provided with a series of slots 80, not only to guide blades 65 of FIG. 10 during their upward and downward movement, but also to remove any debris, such as paper, which may become wrapped around the blades.

Figure 10:
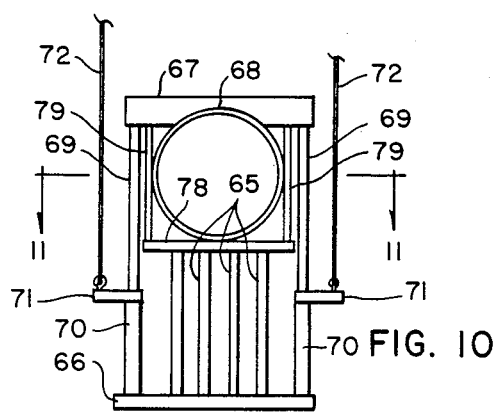
FIG. 10 is a front elevation of the screen gate of FIG. 9, as supported from the inlet pipe.

As will be evident, when the grid G is moved upwardly, each weight 73, through the corresponding cable 72, will pull the screen grid upwardly to cover the otherwise open end of pipe 10, but when a few minutes later the grid G returns, it will push the screen gate downwardly until the upper ends of blades 65 will clear the outer end of pipe 10, as in FIG. 10, and the trash collected in pipe 10, behind blades 65, may then move outwardly for deposit on grid G. Screen gate S may also be installed for pivoting into and out of position in front of pipe 10, being pivoted from such position by downward movement of the screen grid and moved into position by a counterweight installed on the opposite side of the pivot. Other constructions of the screen gate may also be utilized.

Figure 12:
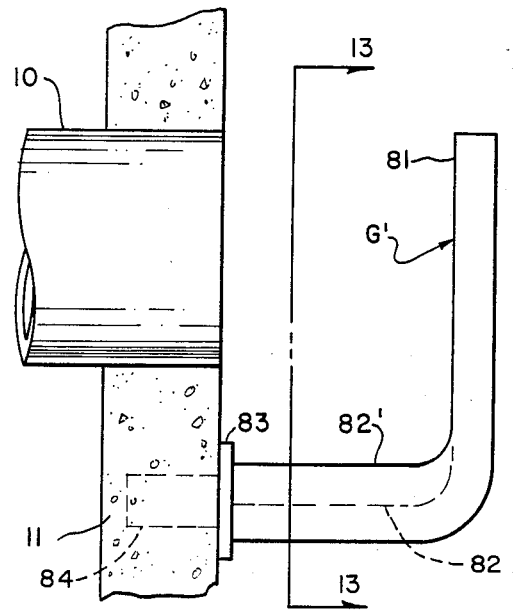
FIG. 12 is a side elevation of a fixed trash screen, also constructed in accordance with this invention and adapted to be cleaned by a rear rake in a conventional manner.

The fixed trash screen $G'$ of FIG. 12 is also adapted to permit lateral discharge of liquid, such as water, even though the grid is filled with trash, which would otherwise tend to block the pipe 10 in the event that the screen grid extended laterally to the wall 11 at each side of pipe 10. The screen grid $G'$ may include a series of upright bars 81 which are rectangular in cross section and extend downwardly but have forwardly extending, integral lower legs 82, except the two outside bars which have lower legs 82' of greater depth than the remainder of the bars. The effect of the greater depth of the lower legs 82', on the outside, is to retain the trash on the screen grid more effectively. The front ends of the lower legs 82 and 82' may be attached to an anchor plate 83, which, in turn, is affixed to or removably attached to an anchor 84 embedded in wall 11. The fixed screen grid G' may be cleared periodically by a device similar to the screen grid G, such as the cleaning rake C of FIGS. 14–16.

Cleaning rake C of FIGS. 14–16 is moved downwardly by a chain 31' along a path spaced laterally from the position of screen grid G', past the right hand position of FIG. 14 and around a lower sprocket 33' to a position beneath the screen grid G', then past the screen grid to the left hand position of FIG. 14, thence upwardly past a deflector D and a wiper W. In general, deflector D causes debris falling or pushed off cleaning rake C by wiper W to be deposited in a receptacle 19'. Cleaning rake C may be periodically stopped in a position above wiper W, before or after passage around an upper sprocket 32', adjustable between the two dotted positions shown, as by a limit switch similar to limit switch 62 of FIG. 7, or adjacent the right hand position shown. Such a limit switch may be coordinated with a conventional timing mechanism for starting cleaning rake C on another trip past screen grid G' and deflector D and wiper W, after a predetermined period of time, as on the order of 10 to 20 minutes.

Cleaning rake C of FIGS. 14–16 includes a series of lower fingers 85 extending forwardly, from a horizontal plate 86 having a rear, depending, mounting flange 87 attached to a link of chain 31'. An upwardly and rearwardly inclined, transverse plate 88 and plate 86 extend between a pair of side plates 89, to which the ends of plates 86 and 88 are attached, as by welding, while the lower edge of plate 88 may be similarly attached to plate 86. Each side plate 89 is generally diamond shaped but extends downwardly below the fingers 86 for a distance greater than its upward extension, as to the top of plate 88, for a purpose described later. The fingers 85 of the cleaning rake C, as it moves past screen grid G', are interspaced with the bars 80 of the screen grid, so that as the cleaning rake moves upwardly, the debris collected on screen grid G' will be intercepted by the cleaning rake to be moved upwardly and deposited in receptacle 19' or other appropriate place. Transverse plate 88 passes behind bars 81 as fingers 85 move upwardly between the bars and permit the accumulation of debris on the fingers 85 to shift rearwardly as the fingers leave the upper ends of bars 81, thereby decreasing the amount of debris which may fall back onto lower legs 82 of grid G'.

An upright beam 90, as in FIG. 14, is disposed in a laterally off-center position, while a transverse plate 91, mounted on beam 90, extends laterally to support two adjustable bearing mounts 44' for a shaft for lower sprocket 33', around which chain 31' extends, and to permit cleaning rake C to move around lower sprocket 33' and upwardly beneath fixed screen grid G'. A pair of lateral support beams 37' extend from one side to the upper and lower ends of upright beam 90. At its upper end, chain 31' moves around upper pulley 32' which may be driven by a chain 92 from a reduction unit 46', in turn driven by a motor 47'. A multiple belt drive, or a single or multiple chain drive, may be substituted for the single chain 92 shown. As the cleaning rake C moves upwardly behind the fixed grid G', the rear surface, near each outer edge, of mounting flange 87 will engage a guide support 93, spaced to each side of the path of chain 31' and along which the mounting flange 87 moves, to stabilize the cleaning rake C as it encounters the debris collected on fixed grid G', in order to prevent a local buckling of any of the links of chain 31'. The cleaning rake C is thus moved upwardly with its load of debris, past the left hand position shown in FIG. 13 and upwardly to the deflector D and then into engagement with the wiper W, as indicated. A second set of support guides 93' are positioned opposite the deflector D and wiper W, for similar engagement by the rear surface of mounting flange 87, again to prevent buckling of any link of chain 31'.

The deflector D is provided with a plate 94 which is pivoted by a pair of hinges 95, attached to the lower front edge thereof, and further provided with a guide arm 96 at each side, which extends downwardly past the respective end of plate 94 to an extension 97, as in FIG. 14, which is parallel to, but spaced downwardly from, the bottom of plate 94. Each guide arm 96 and its extension 97 is placed in alignment with the side plates 89 of cleaning rake C, so that as the cleaning rake is moved upwardly, each extension 97 will be engaged by the corresponding side plate 89 and thereby cause guide plate 94 to be moved upwardly by the side plates 89, while the flange 87 of the cleaning rake C is in engagement with the upper guide supports 93', so as to tip the deflector D upwardly and forwardly, then permit the deflector to fall back to the position shown in FIG. 14. The wiper W is provided with a blade 98, which is mounted at each side on rollers 99 which move along and between the upper leg of an angularly placed angle 100 and the lower leg of a parallel angle 101. Thus, wiper blade 98 is movable upwardly and forwardly, then downwardly and rearwardly, so that the lower edge of inclined blade 98 will first move downwardly along the plate 88 of cleaning rake C and then forwardly along the fingers 85, being simultaneously moved upwardly by the same fingers. This combination of movement of the wiper blade 98 and the fingers of the cleaning rake C will cause debris carried by the cleaning rake to be pushed off the fingers and onto plate 94 of deflector D, for discharge into receptacle 19'.

As illustrated in FIG. 17, as well as FIG. 14, plate 94 of the deflector is provided with an upper lip 103, which extends angularly rearwardly, as well as an outwardly and upwardly extending flange 104 at each side, in order to assist the deposit and retention of debris on the deflector plate, until it slides off forwardly. Each guide arm 96 is reinforced by a triangular brace 105 and provided with a forwardly inclined lip 106 at its upper edge. Each hinge 95 for the deflector plate 94, as in FIG. 14, may be mounted on a floor 108 of a lateral compartment 109 of a housing 16', on the top of which a gear reducer 46', driven by a motor 47', may be mounted. Bottom wall 108 of the compartment may be provided with an outlet 110, through which debris sliding off deflector plate 94 may fall into receptacle 19'.

When an upper front, inclined edge 112 of the corresponding side plate 89 engages the guide arm extension 97, the deflector plate 94 will be pivoted upwardly and forwardly by further upward movement of the cleaning rake C, until the forward point 113 of the corresponding side plate 89 reaches the corner between guide arm 96 and its extension 97. As the cleaning grid C continues to move upwardly, each guide arm 96 will slide down along the forward point of the corresponding side plate 87, until the lower front edge 114 of each side plate clears the corresponding guide arm. It will be noted that, as the front corners of side plates 89 start to move along the guide arms 96, lip 103 of deflector plate 94 will begin to move beneath the front ends of fingers 85, while by the time guide arms 96 clear the lower front edge 114 of the corresponding side plates, deflector plate 94 will be completely beneath the cleaning grid. It will be further noted from FIG. 14 that the angle of inclination of the lower front edge 114 of each side plate 89 corresponds to the angle of inclination of the corresponding guide arm 96 in the delivery position shown. Thus, as soon as the corner between extension 97 and a guide arm 96 clears front point 113, the deflector will tip rearwardly until each guide arm 96 engages the lower front edge 114 of the corresponding side plate, and the deflector will then be in the delivery position. A conventional stop (not shown) may be provided for the deflector plate 94, to maintain the deflector D in the position shown, until moved upwardly and forwardly, then fall back rearwardly, as described.

As illustrated in FIG. 18, the wiper blade 98 is provided with a triangular reinforcing and supporting structure 116 at each side, the lateral end of each of which is attached to a plate 117, on which a corresponding pair of rollers 99 are mounted by the respective shaft 118. A nut and washer assembly 119 may be utilized to secure the shafts 118 and the rollers 99 to the corresponding plate 117. As indicated previously, the rollers 99 move along the top leg of inclined angle 100, at each side, while a parallel upper angle 101 is spaced from the angle 100 to maintain the rollers 99 in position on angle 100. The lower flange of angle 101 may have a lesser width than the upper flange of angle 100, so that plate 117 may extend above the lower flange of angle 101, as in FIG. 14, to provide lateral guides for the wiper blade. At the rear, lower end of angles 100 and 101, a stop 120 of FIG. 18 may be attached, as by welding, to the end of each angle to limit the downward and rearward movement of the wiper. If desired, a similar stop may be removably attached, in a conventional manner, to the upper, front ends of the angles 100 and 101, to prevent any undue impetus to the wiper from propelling it out of its tracks.

The alternative fixed grid G" of FIG. 19 includes bars 81' having forwardly extending, lower legs 82 which are attached to a wall 11 and pipe 10 of FIG. 12, being attached to the wall in a similar manner. However, the fixed grid G" is provided with a pair of side plates 121, also attached to the wall, as to an anchor plate corresponding to anchor plate 83 of FIG. 12. Side plates 121 are provided with holes 122, particularly in the upper portions of the side plates, which permits the flow of liquid until plugged by debris. However, the bars 81" terminate below the upper ends of plates 121 and thereby permit an overflow of liquid, in the event that the bars become plugged.

The alternative self dumping screen illustrated in FIG. 20 includes a bottom plate 125, conveniently formed integrally with side plates 126 and 127, with a curve at the corner to facilitate the discharge of debris. A back plate 128 is attached to the rear of bottom plate 125 and side plates 126, 127 but terminates below the upper ends of side plates 126 and 127, in a manner similar to upright bars 81' of FIG. 19. The self-cleaning screen of FIG. 20 is generally bucket-shaped and each of the bottom, side and back plates is provided with a series of holes 129, with the holes in the bottom and side plates extending from front to rear as well as laterally for the bottom plate and vertically for the side plates, in a pattern similar to that shown for the back plate 128. It will be noted that the holes 129 will permit the flow of liquid until plugged, but that the back plate 128 will permit overflow at the rear. The screen of FIG. 20 may be moved periodically between a lower receiving position and an upper discharging position, in essentially the same manner as the grid G of FIGS. 1–8. Heavy woven screens may be substituted for any of the perforated plates 126, 127 or 128 of FIG. 20.

Figure 13:
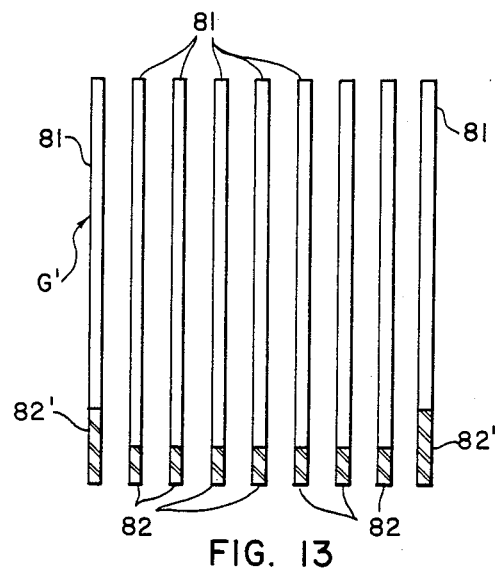
FIG. 13 is a vertical section taken along line 13—13 of FIG. 11.
Figure 21:
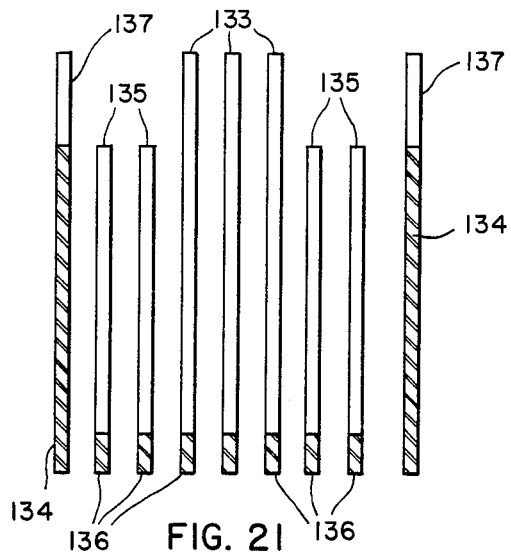
FIG. 21 is a vertical section, similar to FIGS. 13 and 19, showing a fixed grid which may also be utilized as a self dumping screen.

The screen grid of FIG. 21 may be mounted at the rear for movement upwardly and downwardly, similarly to the screen grid of FIGS. 1–8, or may be a fixed screen grid, similar to that of FIGS. 12 and 13. This screen grid includes a series of generally upright center bars 133 which extend to a position corresponding to the upper edge of the conduit, in front of which the grid is positioned to collect debris. The grid may be affixed to the wall through which the conduit extends or mounted for upward movement, as by chains, and discharge of debris at an upper position. A pair of side plates 134 extend forwardly to or toward the wall, while interspersed between the side plates and the center bars are a series, such as two, each of generally upwardly extending bars 135 which are lower in height than the center bars. The lower legs 136 of the generally upright bars 133 and 135 extend forwardly toward a wall, as in FIG. 1, or to an anchor therein, as in FIG. 12. The side plates 134 are provided with upper spaces 137 intermediate the front and rear edges, so that the upper spaces 137, as well as the spaces above interspaced bars 135, permit an overflow of liquid in the event that the spaces between the bars 133 and 135 become plugged. Preferably, the upper ends of bars 135 and the lower edges of spaces 137 correspond to the maximum flow expected to be handled by the conduit, i.e. the maximum flow for which the conduit is designed.

Figure 22:
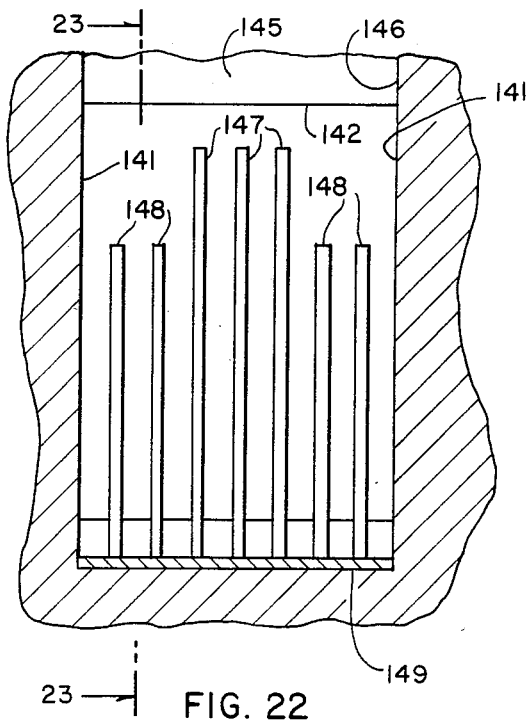
FIG. 22 is a fragmentary transverse section, taken along line 22—22 of FIG. 23, showing a fixed grid in a tunnel.
Figure 23:
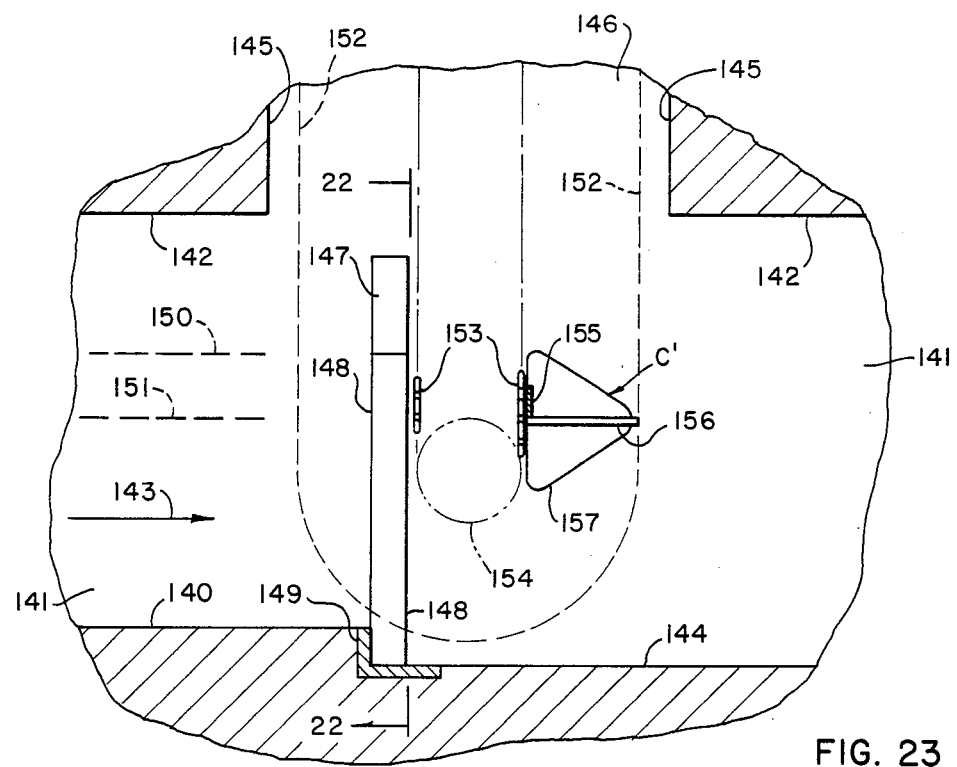
FIG. 23 is a fragmentary longitudinal section taken along line 23—23 of FIG. 22 showing also a portion of the cleaning rake mechanism for back cleaning the grid.

The fixed bar screen of FIGS. 22 and 23 is similar in certain respects to the bar screen of FIG. 21, but is installed in a tunnel having a bottom 140, sides 141 and a roof 142, the flow in the tunnel being in the direction of arrow 143. Beyond the bar screen is a downward offset 144 of the tunnel bottom, for a purpose described later. A downwardly extending open shaft having ends 145 and sides 146 intersects the roof 142 of the tunnel to accommodate movement of a cleaning rake C'.

The bar screen itself includes a series of center bars 147, such as three, and a series of side bars 148, such as two, on each side of the center bars and lower than the center bars. The outside bars 148 are preferably spaced the same distance from the sides of the tunnel as the bars themselves. The bars 147 and 148 are attached to and supported by an angle 149 which is installed at the juncture of bottom 140 and its downward offset 144. The upper ends of bars 147 are slightly below the roof of the tunnel, while the upper ends of bars 148 are preferably positioned at the emergency level indicated by dotted lines 150, above the dotted line 151 indicating maximum expected flow, i.e. peak flow for which the tunnel is designed. Of course, when the downward offset 144 is encountered, the height of both the emergency flow and expected maximum flow will be lower, so that the roof 142 of the tunnel at that point may be spaced further above the bottom 144 of the tunnel, in order to accommodate any overflow over the upper ends of upright bars 148 when all of the bars have become plugged, such as due to a power failure or mechanical failure which prevents the cleaning rake C' from operating. The value of a self-relieving bar screen, which permits an overflow when a failure prevents the normal cleaing of the screen, assists greatly in preventing any flooding of the apparatus above the bar screen, or backing up of liquid in the tunnel, so as to flood upstream installations or cause the dislodgement of manholes and flooding of streets.

In order to move the cleaning rake C' around its cleaning path, indicated by dotted line 152, a chain 153, as at each side of the tunnel, moves around a lower sprocket 154, which is mounted for rotation in a suitable manner, as on a conventional support (not shown) at the corresponding side of the tunnel. The cleaning rake C' may be similar to cleaning rake C of FIG. 14, thus including a back plate 155 which is attached to a link of chain 154 and from which a series of fingers 156 extend, or from a flange attached to the back plate. A pair of side plates 157 extend between the outermost bars 148 and the side wall, of the tunnel, to retain debris on the fingers 156 and perform other functions similar to side plates 89 of FIG. 15. The dot-dash line 152 indicates the path of travel of the outer ends of the fingers 156, as the cleaning rake C' moves downwardly at the right in FIG. 23, then around pulley 154, until the fingers extend through the spaces between the bars 147 and 148, and side plates 157 move close to the respective sides 141 of the tunnel, and extend between the outermost bars 148, and the tunnel sides, to collect any debris which might collect against the bars on the front side and carry such debris upwardly to a point of discharge, otherwise in a manner similar to cleaning rake C of FIG. 14. Thus, appropriate mechanism for discharging the debris collected and carried upwardly by cleaning rake C' may be similar to that provided for cleaning rake C, as in FIG. 14.

Although more than one embodiment of this invention has been illustrated and described, it will be understood that other embodiments may exist and that various changes may be made, without departing from the spirit and scope of this invention.

What is claimed is:

1. A self relieving bar screen in combination with an upright wall and an inflow conduit, said screen being positioned and arranged so as to intercept debris moved by a liquid through said conduit into a space defined by the wall a greater which has lateral dimension than that of the conduit, a discharge end of said conduit being operatively position in said wall which extends laterally to each side of said conduit the improvement comprising:

said self relieving bar screen comprising a series of bars disposed in spaced lateral relation in a position with respect to the conduit to form said space having a greater lateral dimension than that of the conduit; opposite the discharge end of said conduit, said wall also extending laterally to each side of said series of bars;

each said bar having a lower portion which extends to a position below the conduit and adjacent said wall and a rear, generally upwardly extending portion connected to the rear of said forwardly extending portion, said generally upwardly extending portion extending upwardly at or adjacent to a position generally opposite the top of said conduit; and said series of bars extending laterally past each side of said conduit but for a distance less than the width of said wall, whereby debris may accumulate on said bars but liquid may flow to each side of said bar screen into spaces defined by the lateral ends of said bar screen.

2. The combination as defined in claim 1, including:
means for supporting said bar screen opposite said conduit with said lower portions of said bars generally horizontal and sufficient in extent from front to rear to carry the collected debris; and
wherein said rear portions of said bar screen slant upwardly and rearwardly away from said lower portions.

3. The combination as defined in claim 1, wherein:
the lower portions of the outermost bars have a greater depth than the lower portions of the bars therebetween.

4. The combination as defined in claim 1, including:
means affixing the inner ends of said lower portions of said bars to said wall below said conduit; and
means for periodically removing debris accumulating on said bar screen.

5. The combination as defined in claim 4, wherein:
the inner ends of said lower portions of said bars are attached to an anchor embedded in said wall below said conduit.

6. The combination as defined in claim 4, wherein:
said lower and said rear portions of said bars are free, whereby said means for removing debris is provided with generally horizontal teeth movable from the rear to beneath said bar screen and then upwardly with the teeth of said removing means between the bars of said bar screen.

7. The combination defined in claim 6, including:
a plate at each side of said teeth of said removing means for moving outside said bar screen when said teeth of said removing means move upwardly between said bars of said bar screen, said teeth of said removing means being associated with a transverse rear member and an upwardly extending member;
moving means connected to said removing means for moving said removing means upwardly to a dumping position and then downwardly along a path rearwardly of said upper movement, then around to the position of said upward movement, whereby said removing means is positioned beneath said bar screen for further upward movement;
guide plates engageable by said transverse member of said removing means, spaced rearwardly from said bar screen and also spaced rearwardly from said dumping position;
a pivotal deflector plate which is positioned to be intercepted and then pivoted forwardly and upwardly by said removing means as it approaches said dumping position, but falls back to a rearwardly, upwardly slanting position below said removing means when said removing means reaches said dumping position;
a wiper plate mounted for movement forwardly and upwardly at said dumping position and engageable with said upwardly extending member of said removing means and then said teeth of said removing means, in order to move debris onto said deflector plate; and
means for collecting debris sliding off said deflector plate.

8. The combination, as defined in claim 1, including:
means for moving said bar screen essentially vertically to a position spaced above said discharge end of said conduit; and
means for effecting a removal of collected debris from said bar screen at said spaced position.

9. The combination, as defined in claim 8, including:

means for maintaining said bar screen in a position operatively holding debris during such movement to said spaced position.

10. The combination as defined in claim 9, including: a screen gate positioned below said conduit discharge end and means for moving the screen gate to cover said discharge end of said conduit as said bar screen moves upwardly, whereby said screen gate intercepts debris while said bar screen is away from said conduit to dump previously collected debris.

11. The combination as defined in claim 10, wherein: said screen gate being constructed and arranged so that said bar screen moves said screen gate downwardly from said conduit discharge end upon the return thereof from dumping debris.

12. The combination as defined in claim 10, including: at least one counterweight cable connected to said screen gate for lifting said screen gate when released by upward movement of said bar screen.

13. The combination as defined in claim 10, including: a depending guide rod and socket arrangement at each side of the discharge end of said conduit for guiding said screen gate during upward and downward movement.

14. The combination as defined in claim 9, including: means for guiding said bar screen during such movement.

15. The combination as defined in claim 14, including: roller or sliding block means attached to and movable with said bar screen; and
guide means for said roller or sliding block means.

16. The combination as defined in claim 14, including: means for tipping said bar screen so that debris is dumped at a position above the conduit.

17. The combination as defined in claim 14, wherein: said guide means for said roller or sliding block means has a curved portion for producing said tipping of said bar screen.

18. The combination as defined in claim 4, including: pivoted rake means for engaging debris carried by said bar screen during said tipping, to assist in the removal of said debris.

19. The combination as defined in claim 18, wherein: said rake means includes a transversely disposed plate positioned for relative movement of said generally upright bar portions rearwardly of said plate; and
pivot arm means supporting said plate, whereby said plate moves along said normally lower portions of said bars as said screen is tipped to push debris off said lower portions.

20. The combination as defined in claim 19, including: a drive means movable upwardly and downwardly at each side of said bar screen;
a cross bar having a rearwardly extending flange at each end and attached at an intermediate position to the rear side of said rear portion of said bars;
a guide bar having an intermediate attachment to the rear end of each said flange and carrying, at its upper end, a roller which engages a channel, providing said guide means, and pivotally connected, at its lower end, to one of said drive means; and
a receptacle disposed forwardly of and below the upper position of said bar screen, for receiving debris sliding or pushed off said bar screen while tipped.

21. In a self-relieving screen is combination with an upright wall and a flow conduit, said screen being positioned and arranged so as to intercept debris moved by a liquid through said conduit into a space defined by the wall which has a greater lateral dimension than that of the conduit, a discharge end of said conduit being operatively positioned in said wall, the improvement comprising:
said self relieving screen being disposed in a spaced position respect to and opposite the discharge end of said conduit and having means for intercepting debris but permitting flow of liquid therethrough except when clogged by debris;
said wall having a lateral portion at each side of said conduit which extends laterally to each side of said screen;
said self relieving screen including lower intercepting means disposed below the conduit and extending laterally to opposite sides of the conduit;
said intercepting means also including rear intercepting means extending upwardly from the rear of said lower intercepting means and to one or more positions at preselected distances above said lower intercepting means;
said self relieving screen having a space at each side and said wall extending laterally to each side of said screen a distance sufficient to permit liquid to flow to each side of said self relieving screen when debris accumulates on said self relieving screen in sufficient amount to severely impede or prevent flow of liquid through said lower and rear intercepting means;
means for moving said screen to a position spaced from said discharge end of said conduit; and
means for effecting a removal of collected debris from said screen at said position spaced from said discharge end of said conduit.

22. In a self-relieving screen in combination with an upright wall and a flow conduit, said screen being positioned and arranged so as to intercept debris moved by a liquid through said conduit into a space defined by the wall which has a greater lateral dimension than that of the conduit, a discharge end of said conduit being operatively positioned in said wall, the improvement comprising:
said self relieving screen being disposed in a spaced position with respect to and opposite the discharge end of said conduit and having means for intercepting debris but permitting flow of liquid therethrough except when clogged by debris;
said wall having a lateral portion at each side of said conduit which extends laterally to each side of said screen;
said self relieving screen having, in combination, a pair of side members, a lower member and a rear upwardly extending member;
said pair of side members being provided with a plurality of apertures and disposed in spaced lateral relation in positions at opposite sides of the discharge and of said conduit;
said lower member being provided with a plurality of apertures and extending between and attached to said side members below the lower edge of said conduit, said lower member and side members extending to a position adjacent side walls;
said rear, generally upwardly extending member being provided with a plurality of apertures and connected to the rear of each said side member and said lower member; said rear member extending upwardly to a position below the upper edge of said side members;
said lower member being disposed below the conduit and extending laterally to opposite sides of the conduit;

said wall extending laterally to each side of said screen a distance sufficient to permit liquid to flow to each side of said self relieving screen until clogged with debris, with flow of liquid above said rear member being permitted when said apertures become clogged;

means for moving said screen to a position spaced from said discharge end of said conduit; and means for effecting a removal of collected debris from said screen at said position spaced from said discharge end of said conduit.

23. In a self-relieving screen in combination with an upright wall and a flow conduit, said screen being positioned and arranged so as to intercept debris moved by a liquid through said conduit into a space defined by the wall which has a greater lateral dimension than that of the conduit, a discharge end of said conduit being operatively positioned in said wall, the improvement comprising:

said self relieving screen being disposed in a spaced position with respect to and opposite the discharge end of said conduit and having means for intercepting debris but permitting flow of liquid therethrough except when clogged by debris;

said wall having a lateral portion at each side of said conduit which extends laterally to each side of said screen;

said self relieving screen having the combination of upright bars each having a lower leg extending toward said conduit and an upright plate at each side of said bars;

said upright bars being disposed in laterally spaced relation opposite the end of said conduit and extending upwardly from a position at or below the lower edge of said conduit, a portion of said bars extending upwardly to a position at or above the top of said conduit and the remainder of said bars extending upwardly to a position below the top of said conduit;

each of said bars having a lower leg extending toward said conduit at a position at or below the conduit;

each of said upright plates extending toward said conduit, each said plate having an aperture extending downwardly from its upper edge to a position corresponding to the upper ends of said remainder of said bars;

said bars permitting flow of liquid therethrough except when clogged by debris and said wall extending laterally to each side of said self relieving screen a distance sufficient to permit liquid to flow to each side of said self relieving screen through said aperture in each said side plate as well as over said bars extending to a position below the top of the conduit when said bars are clogged by debris;

means for moving said screen to a position spaced from said discharge end of said conduit; and means for effecting a removal of collected debris from said screen at said position spaced from said discharge end of said conduit.

* * * * *